(12) United States Patent
Kanaev et al.

(10) Patent No.: US 8,559,719 B2
(45) Date of Patent: Oct. 15, 2013

(54) SPECTRAL ANOMALY DETECTION IN DEEP SHADOWS

(75) Inventors: Andrey V. Kanaev, Lorton, VA (US); Jeremy Murray-Krezan, Albuquerque, NM (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 347 days.

(21) Appl. No.: 13/047,637

(22) Filed: Mar. 14, 2011

(65) Prior Publication Data

US 2011/0221926 A1 Sep. 15, 2011

Related U.S. Application Data

(60) Provisional application No. 61/313,501, filed on Mar. 12, 2010.

(51) Int. Cl.
*G06K 9/34* (2006.01)
(52) U.S. Cl.
USPC .......................... 382/174; 348/222.1; 348/247
(58) Field of Classification Search
USPC ................................ 382/174; 348/222.1, 247
See application file for complete search history.

(56) References Cited

U.S. PATENT DOCUMENTS

| | | | | |
|---|---|---|---|---|
| 6,895,115 | B2 * | 5/2005 | Tilton | 382/180 |
| 7,532,320 | B2 * | 5/2009 | Neiss et al. | 356/301 |
| 2008/0184189 | A1 * | 7/2008 | Rosenbluth | 716/19 |

OTHER PUBLICATIONS

Kwon et al. "Hyperspectral anomaly detection using kernel RX-algorithm"; Oct. 2004 International Conference on Image Processing (ICIP) pp. 3331-3334.*
A. Schaum, "Joint subspace detection of hyperspectral targets," IEEE Aerospace Conference Proc. 3, pp. 1818-1824 (Mar. 2004).
A. Schaum, "Autonomous hyperspectral target detection with quasi-stationarity violation at background boundaries," 35th Applied Imagery and Pattern Recognition Workshop, IEEE (Oct. 2006).
M. Sezgin and B. Sankur, "Survey over image thresholding techniques and quantitative performance evaluation," Journal of Electronic Imaging 13(1), pp. 146-165 (Jan. 2004).
E. Ensafi and A. D. Stocker, "An adaptive CFAR algorithm for real-time hyperspectral target detection," Proceedings of Algorithms and Technologies for Multispectral, Hyperspectral, and Ultraspectral Imagery XV, Proc. of SPIE vol. 7334 (Apr. 2008).
T. N. Pappas, "An adaptive clustering algorithm for image segmentation," IEEE Transactions on signal processing vol. 10, 1, pp. 901-914 (Apr. 1992).
I. T. Jolliffe "Principal Component Analysis", Series: Springer Series in Statistics, 2nd ed., Springer, NY, XXIX, 487 p. 27-28 (Oct. 2002).

(Continued)

*Primary Examiner* — Chan S Park
*Assistant Examiner* — Eueng-Nan Yeh
(74) *Attorney, Agent, or Firm* — US Naval Research Laboratory; Kerry L. Broome

(57) ABSTRACT

A spectral anomaly detection method includes the steps of segmenting a panchromatic image, obtained from a hyperspectral sensor into cluster data sets. Principal component analysis can be separately performed on each of the cluster data sets to produce a plot of principal components. An anomaly detection algorithm can be applied to an adaptively selected subset of principal components for each of the cluster data sets to produce cluster detection scores. Finally, separate detection thresholding algorithms can be applied to each of the cluster detection scores, and the results of the detection thresholding algorithms can be combined into a single detection plane.

9 Claims, 5 Drawing Sheets

(56) References Cited

OTHER PUBLICATIONS

A. V. Kanaev and J. Murray-Krezan, "Spectral anomaly detection in deep shadows," *Appl. Opt.*, vol. 49, Issue 9, pp. 1614-1622 (Mar. 20, 2010).

A. V. Kanaev and J. Murray-Krezan, "Segmentation Adaptive Rx: an algorithm for spectral anomaly detection in a variety of measured-radiance conditions" Proc. of Algorithms and Technologies for Multispectral, Hyperspectral, and Ultraspectral Imagery XVI, SPIE Defence, Security, and Sensing Symposium, Orlando FL, Apr. 5-8, 2010.

E. A. Ashton, B. D. Wemett, R. A. Leathers, T. V. Downes, "A novel method for illumination suppression in hyperspectral images," Algorithms and Technologies for Multispectral, Hyperspectral, and Ultraspectral Imagery XIV, Proc. of SPIE vol. 6966 (Mar. 2008).

M. J. Carlotto, "A cluster based approach for detecting man-made objects and changes in imagery," IEEE Trans. on GRS, 43(2), pp. 374-387 (Feb. 2005).

P. C. Hytla, R. C. Hardie, M. T. Eismann, and J. Meola "Anomaly detection in hyperspectral imagery: comparison of methods using diurnal and seasonal data," J. of Applied Remote Sensing, vol. 3 (Jan. 2009).

M. T. Eismann, J. Meola, A. D. Stocker, S. G. Beaven, and A. P. Schaum, "Airborne hyperspectral detection of small changes," Appl. Opt., vol. 47, 28 (Oct. 2008).

R. Mayer, J. Antoniades, M. Baumback, D. Chester, J. Edwards, A. Goldstein, D. Haas, S. Henderson, "Shadowed object detection for hyperspectral imagery," Infrared Spaceborne Remote Sensing and Instrumentation XV, Proc. of SPIE vol. 6678 (Sep. 2007).

S. M. Adler-Golden, R. Y. Levine, M. W. Matthew, S. C. Richtsmeier, L. S. Bernstein, J. Gruninger, G. Felde, M. Hoke, G. P. Anderson, and A. Ratkowski, "Shadow-insensitive material detection/classification with atmospherically corrected hyperspectral imagery," Algorithms for Multispectral, Hyperspectral, and Ultraspectral Imagery VII, Proc. of SPIE vol. 4381 (Aug. 2001).

D. W. J. Stein, S. G. Beaven, L. E. Hoff, Edwin M. Winter, A. P. Schaum, and A. D. Stocker, "Anomaly Detection from Hyperspectral Imagery," IEEE Signal Processing Magazine, 19, pp. 58-69 (Jan. 2002).

A. Schaum and A. D. Stocker, "Hyperspectral change detection and supervised matched filtering based on Covariance Equalization," Proc. of SPIE vol. 5425, pp. 77-90 (Aug. 2004).

* cited by examiner

SPECTRAL ANOMALY DETECTION IN DEEP SHADOWS

CROSS-REFERENCE TO RELATED APPLICATIONS

This application claims priority to provisional patent application entitled, "Spectral Anomaly Detection in Deep Shadows," filed on Mar. 12, 2010, and assigned U.S. Application No. 61/313,501; the entire contents of which are hereby incorporated by reference.

FIELD OF THE INVENTION

The invention relates generally to anomaly detection in hyperspectral imaging. More specifically, the invention relates to a spectral anomaly detection method that can achieve automated manmade object detection in shadows.

BACKGROUND

Hyperspectral imagery can used to detect man made objects and classify backgrounds. The imagery is obtained by hyperspectral sensors, which represent a class of optical sensor that can collect a spectrum from each point in a scene. For remote sensing applications, they are typically deployed on either aircraft or satellites. Airborne hyperspectral imaging deals with imaging narrow spectral bands (e.g., approximately 10-20 nm) over a contiguous spectral range, and produces the spectra of all pixels in the scene. The data product from a hyperspectral sensor is typically a three-dimensional array or "cube" of data with the width and length of the array corresponding to spatial dimensions and the spectrum of each point as the third dimension.

In spectral space, anomalies are typically defined with reference to a model of the background. Background models can be developed adaptively using reference data from either a local neighborhood of the test pixel or a large section of the image. The typical approach to modeling the background probability density function is as a uni-modal multivariate Gaussian.

Statistical anomaly detectors can then classify hyperspectral image pixels into either background or anomaly clusters. The measured vector of radiances, for each image pixel, can be tested against the anomaly criterion typically described by a pair of statistical hypotheses: probability of the pixel to belong to the background and probability of the pixel to belong to the anomaly. Typically, when the anomalous spectral signature is unknown the Generalized Likelihood Ratio (GLR) test is used, which leads to an RX detection algorithm, such as the subspace RX (SSRX) algorithm.

In the prior art, a well-illuminated natural background typically satisfies the Gaussian model assumption and SSRX detection works reasonably well in that particular case. However, the presence of shadows violates the background model assumptions causing false alarms and missed detections of objects in shadows when the previously demonstrated algorithms are employed.

Accordingly, there remains a need in the art for a spectral anomaly detection method that enables detection of spectral anomalies in deep shadows and improved detection of spectral anomalies in poorly illuminated areas.

SUMMARY OF THE INVENTION

The invention satisfies the above-described and other needs by providing for a spectral anomaly detection method that generates a panchromatic image, and segments the panchromatic image into a dark cluster data set and a bright cluster data set. Next, principal component analysis of the dark cluster data set, the bright cluster data set, and a border cluster data set can be separately performed to produce a plot of principal components for the dark cluster data set, the bright cluster data set, and the border cluster data set, wherein the border cluster data set comprises a data set between the bright cluster data set and dark cluster data set. Then, an anomaly detection algorithm can be applied to an adaptively selected subset of principal components for the dark cluster data set, the bright cluster data set, and border cluster data set to produce a dark cluster detection score, a bright cluster detection score, and a border cluster detection score. A separate detection thresholding algorithm is then applied to each of the dark cluster detection score, bright cluster detection score, and border cluster detection score. Finally, the results of the detection thresholding algorithms can be combined in a single detection plane.

According to another aspect of the invention, a spectral anomaly detection system can include a hyperspectral sensor configured to generate a hyperspectral image. A panchromatic image segmenting module can be configured to add all collected bands of hyperspectral data in the hyperspectral image to create a panchromatic image, and then segment the panchromatic image into a dark cluster data set and a bright cluster data set. A principal component analysis module can be configured to separately perform principal component analysis of the dark cluster data set, the bright cluster data set, and a border cluster data set to produce a plot of principal components for the dark cluster data set, the bright cluster data set, and the border cluster data set, wherein the border cluster data set comprises a data set between the bright cluster data set and dark cluster data set. A spectral anomaly detection module can be configured to separately perform spectral anomaly detection to an adaptively selected subset of principal components for the dark cluster data set, the bright cluster data set, and border cluster data set to produce a dark cluster detection score, a bright cluster detection score, and a border cluster detection score. A thresholding module can be configured to separately apply thresholding algorithms to the bright cluster, dark cluster, and border cluster detection scores. A merging module can be configured to combine the results of the detection thresholding algorithms in a single detection plane.

For another aspect of the invention, a spectral anomaly detection method includes the steps of segmenting a panchromatic image, obtained from a hyperspectral sensor into cluster data sets. Principal component analysis can be separately performed on each of the cluster data sets to produce a plot of principal components. An anomaly detection algorithm can be applied to an adaptively selected subset of principal components for each of the cluster data sets to produce cluster detection scores. Finally, separate detection thresholding algorithms can be applied to each of the cluster detection scores, and the results of the detection thresholding algorithms can be combined into a single detection plane.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

Figure 1:
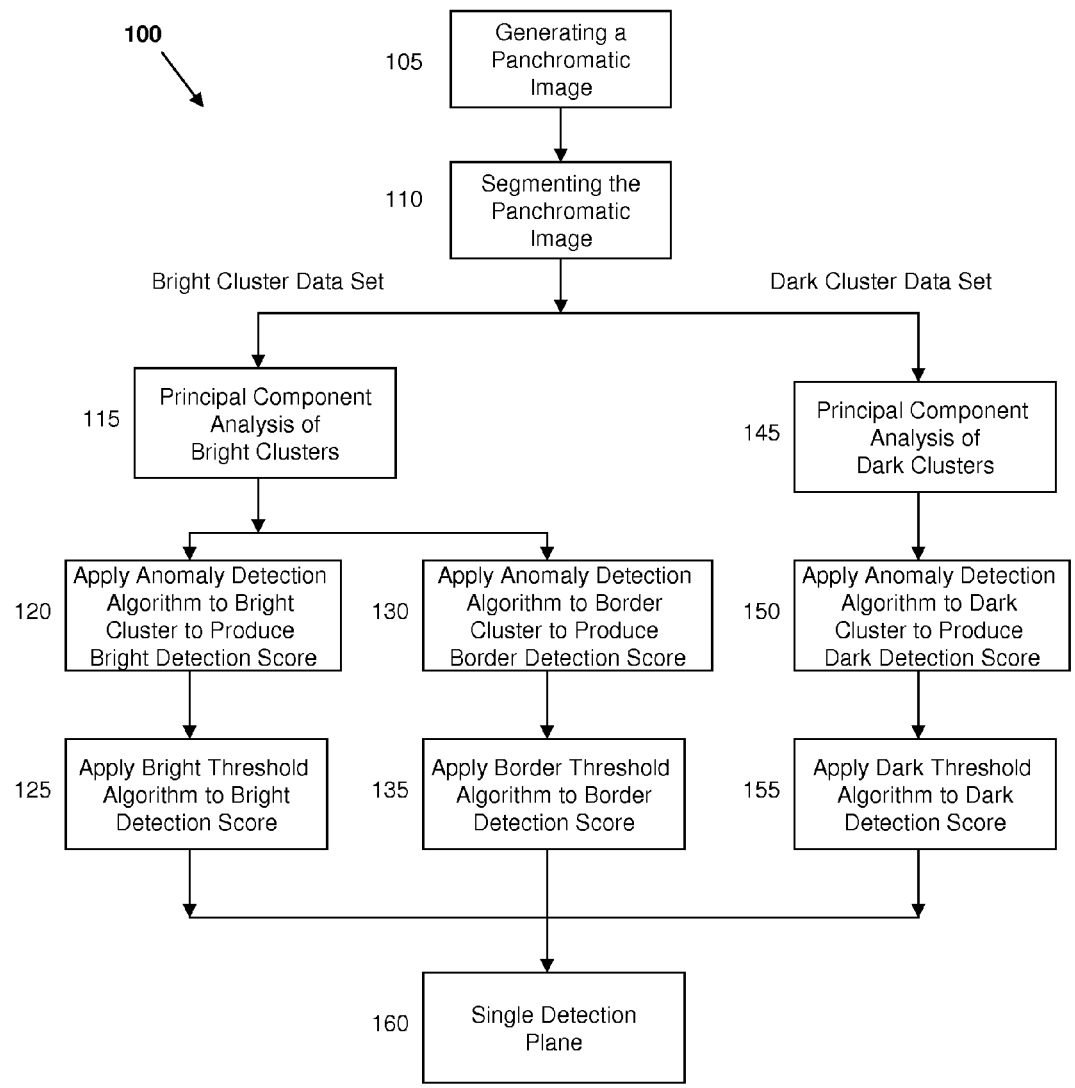
FIG. 1 is a flow chart of a spectral anomaly detection method in accordance with an exemplary embodiment of the invention.

Referring now to the drawings, in which like numerals represent like elements, aspects of the exemplary embodiments will be described in connection with the drawing set.

The invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

To overcome the limitations of the prior art, an exemplary anomaly detection algorithm, Segmentation Adaptive RX (SARX), is presented that can enable detection of spectral anomalies in poorly illuminated, i.e., dark or shadowy, areas. One of ordinary skill in the art will understand that the implementation of the exemplary detection algorithm discussed herein is focused on detection of objects hidden in the shadows in reflective domain hyperspectral imagery; however, the logic behind the exemplary algorithm can be adapted for use with other types of hyperspectral imagery as well.

FIG. 1 is a flow chart of a spectral anomaly detection method 100 in accordance with an exemplary embodiment of the invention. In step 105, a panchromatic image is generated. The panchromatic image can be generated by adding all collected bands of hyperspectral data from a hyperspectral image. The hyperspectral image can be captured and generated with a hyperspectral sensor.

In step 110, the panchromatic image is segmented into dark cluster data sets and bright cluster data sets. The step of segmenting the panchromatic image into dark and bright cluster data sets can include the step of utilizing an adaptive clustering algorithm for gray-level imagery that separates all data set pixels of the panchromatic image into the dark cluster data sets and bright cluster data sets.

More specifically, this technique can be the generalization of K-means clustering, which, known to one of ordinary skill in the art, has previously been developed to include spatial constrains accounting for local intensity variations. This clustering algorithm can avoid over-pixilation and can reduce the extent of the boundary between clusters by taking into consideration the intensity of a particular pixel, as well as its relative position. Each image region can be characterized by a slowly varying envelope intensity function. Given this intensity function, the a posteriori probability density function for a pixel to belong to a certain cluster can be determined. The probability density can contain two competing components: the first component can constrain the region envelope intensity close to the observed image intensity, and the second component can impose spatial continuity. The adaptive clustering algorithm can iteratively alternate between maximizing the probability density function and estimating the intensity envelope. The intensity envelope can be updated by averaging over a sliding window whose size can progressively decrease each time the iteration conditions are met. Initially, the window can be a square with side size approximately $\frac{1}{10}$th of the image size in one dimension. Then, at the end of each iteration that converged, a smaller window can be applied, where the new window size can be reduced by a factor of two. This process can be repeated until the data appears to be well segmented.

Furthermore, the segmentation process can eliminate noise to create distinct segments of bright and dark areas. For example, after segmentation, if a single dark pixel remains that is surrounded by bright pixels, the segmentation process can determine that the single dark pixel is noise. Therefore, the segmentation process can eliminate that single dark pixel, as it is most likely not an anomaly that needs to be detected.

As noted in step 110, the segmentation of the panchromatic image results in a dark cluster data set and a bright cluster data set. The next step is to separately perform principal component analysis of the bright cluster data set in step 115, and perform principal component analysis of dark cluster data set in step 145. The principal component analysis of each of the data sets produces sets of principal components that are the eigenvectors of the covariance matrix and the corresponding eigenvalues are the variances of background statistics along these vector directions. The largest eigenvalues are usually orders of magnitude greater than the smallest in hyperspectral data when natural backgrounds are imaged. The largest principal components typically represent the spatially dependant broadband radiance variations of the imaged backgrounds. More simply, the principal component analysis of each of the data sets produces a plot of principal components of each data set that essentially represent a measure of signal change.

Principal component analysis is known to one of ordinary skill in the art as a mathematical procedure that uses an orthogonal transformation to convert a set of observations of possibly correlated variables into a set of values of uncorrelated variables called principal components. The number of principal components is less than or equal to the number of original variables. This transformation is defined in such a way that the first principal component has as high a variance as possible (that is, accounts for as much of the variability in the data as possible), and each succeeding component in turn has the highest variance possible under the constraint that it be orthogonal to (uncorrelated with) the preceding components. More simply, in principal component analysis, data is transformed to a new coordinate system such that the greatest variance by any projection of the data comes to lie on the first coordinate (called the first principal component), the second greatest variance on the second coordinate (called the second principal component), and so on.

Figure 2A:
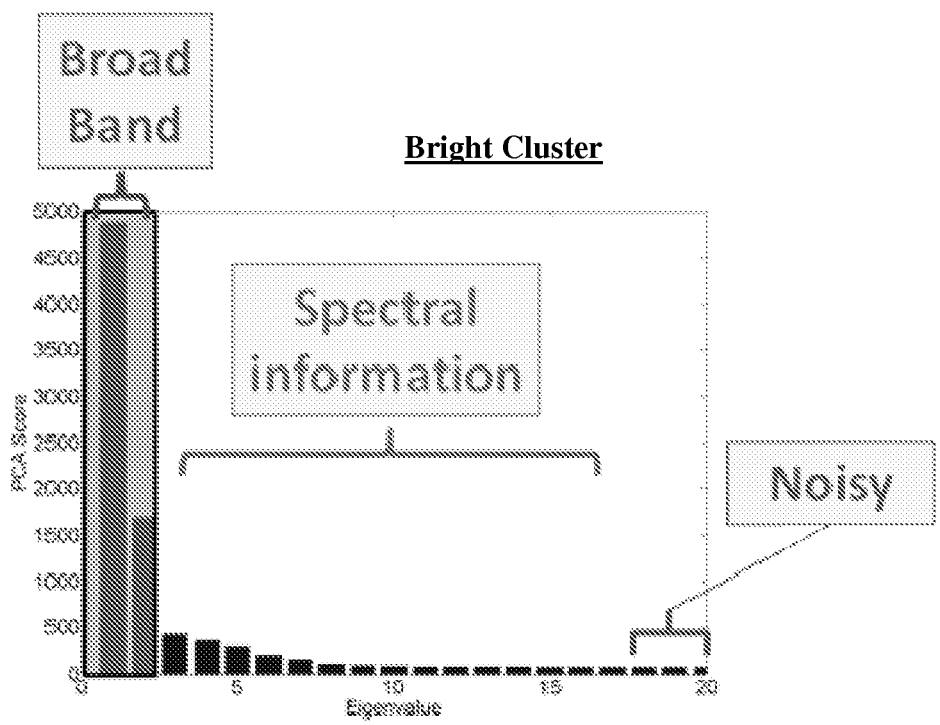
FIG. 2a is an example of a bright cluster principal component analysis output in accordance with an exemplary embodiment of the invention.
Figure 2B:
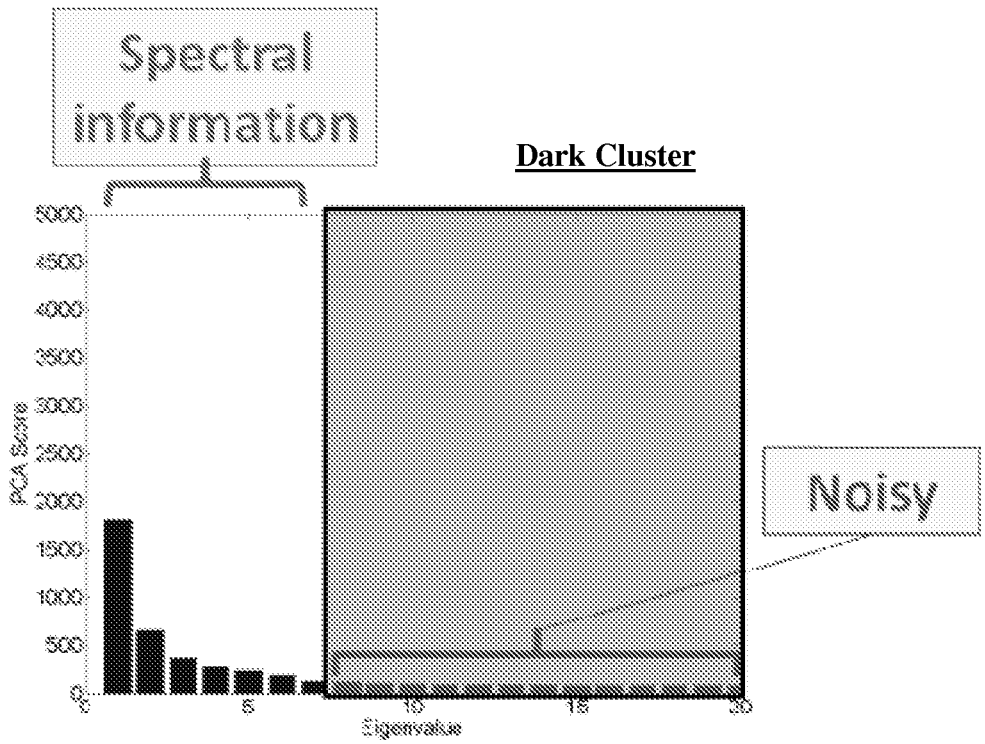
FIG. 2b is an example of a dark cluster principal component analysis output in accordance with an exemplary embodiment of the invention.

An example of a bright cluster principal component analysis output is shown in FIG. 2A. FIG. 2b is an example of a dark cluster principal component analysis output. In each figure, each bar on the graph is a principal component of the data set representing a measure of signal change over each of cluster data sets. For example, FIG. 2b illustrates that dark cluster data set suffers from a poor signal to noise ratio (SNR), as there are many more noise components than the bright cluster data set.

In the prior art, where dark and bright clusters are not segmented in the exemplary step 110, the next step is typically to apply a standard RX anomaly detection algorithm to the principal components after excluding the highest variance principal components from the calculation. The exclusion of the high variance principal components reflects the idea that the detection algorithm should exploit only spectral variations of the targets from the background. This prior art algorithm is known to one of ordinary skill in the art as Subspace RX (SSRX). The underlying hypothesis of the SSRX algorithm is that any spectral dimension, excepting a few of the highest variance principal components, can provide a useful contribution toward spectral background/target separation. The spectral dimension, in which the target is the most anomalous, i.e. attains maximum separation from the background, varies with a particular anomaly signature, and generally is unknown.

However, the application of the prior art SSRX algorithm in dark area cluster data sets is not sufficient. The dramatic dynamic range reduction in dark area cluster data sets changes the situation because poor signal-to-noise ratio effectively renders small variance spectral bands useless. In this situation, subtle anomalous signature features can become lost in noise for the vast majority of the principal component-rotated bands. The only viable signal potentially remaining in the dark cluster data set is in the highest variance principal components.

Therefore, in an exemplary embodiment of the invention, the exemplary detection algorithm in the present invention can be configured separately to adaptively reduce, or vary, the spectral space dimensionality for the different clusters (e.g., bright and dark). More specifically, the exemplary detection algorithm for the dark area cluster can select a subset of low dimensional space of the few highest variance dimensions (e.g., 5-10 principal components). The low signal-to-noise ratio detection hypothesis differs from traditional SSRX assumptions because, in the dark area cluster data set, anomalous signals that are distinguishable from the noisy background are distributed only to the few highest variance dimensions. Furthermore, exemplary detection algorithm can select a subset of the high-dimensional detection space (e.g., a high number of principal components used) for the bright cluster. In both instances, the SSRX algorithm can then be applied to the adaptively selected subset of principal components.

In step 120, an anomaly detection algorithm is applied to an adaptively selected subset of principal components of the bright cluster data set to produce a bright cluster detection score. The subset can be adaptively varied depending on the dimensional space. This can include the steps of determining a detection space dimensionality for the bright cluster data set, and applying the anomaly detection algorithm to the determined detection space dimensionality. In an exemplary embodiment of the invention, the detection space dimensionality for the bright cluster data set can be high-dimensional detection space for bright pixels. For example, the anomaly detection algorithm on the bright cluster data can retain all but the highest variance principal components. Typically, only one to five of the five highest variance principal components are excluded, and more than one-hundred principal components can be retained. In another exemplary embodiment, some of the lowest variance principal components can also be excluded, as those principal components are typically noise. In an exemplary embodiment of the invention, the anomaly detection algorithm that is utilized can be a RX algorithm, such as SSRX.

In step 150, an anomaly detection algorithm is applied to an adaptively selected subset of principal components of the dark cluster data set to produce a dark cluster detection score. The subset can be adaptively varied depending on the dimensional space. This can include the steps of determining a detection space dimensionality for the dark cluster data set, and applying the anomaly detection algorithm to the determined detection space dimensionality. In an exemplary embodiment of the invention, the detection space dimensionality for the dark cluster data set can be low-dimensional detection space for dark pixels. For example, the anomaly detection algorithm on the dark cluster data can retain only the highest variance principal components (e.g., five to ten principal components can be retained). In an exemplary embodiment of the invention, the anomaly detection algorithm that is utilized can be a RX algorithm, such as SSRX.

In an exemplary embodiment of the invention, another cluster data set, a border cluster data set, can be identified and can include a data set between the bright cluster data set and dark cluster data set. More specifically, the pixels on the spatial border region, or boundary, between the dark and bright clusters are classified as the border region.

In step 130, an anomaly detection algorithm is applied to an adaptively selected subset of principal components of the border cluster data set to produce a border cluster detection score. This can provide robustness for the exemplary anomaly detection method performance with respect to slight shifts of the boundary between bright and dark clusters. This can include the steps of determining a detection space dimensionality for the border cluster data set, and applying an anomaly detection algorithm to the determined detection space dimensionality. In an exemplary embodiment of the invention, the detection space dimensionality for the border cluster data set can be a high-dimensional detection space. For example, a high number of principal components can be retained for the boundary cluster data set and utilized by the anomaly detection algorithm. In an exemplary embodiment, the anomaly detection algorithm can be a two-mode version of Stochastic Mixing Model (SMM). SMM anomaly detection can be developed to account for the fact that boundary pixels can consist of arbitrary mixtures of backgrounds that appear in purer form in geographically adjacent areas. In the exemplary anomaly detection algorithm disclosed herein, a boundary pixel's spectrum can represent a mixture of spectra from the dark and the bright clusters, regardless of the background types.

For example, with an imagery of a grass covered field, a forest, and a tree line where shadows are cast onto the grassy field, the exemplary anomaly detection algorithm treats the well-illuminated areas of grass and forest in the bright cluster with high-dimensional SSRX detection, and the dark areas of grass and forest in the dark cluster with another variant of low-dimensional SSRX detection, neglecting the differences between grass and forest in both cases. The dimensionality of the SMM detection subspace is identical to the SSRX detection subspace dimensionality. This subspace dimensionality favors detection in the bright cluster, but it is a necessary choice for the boundary region since the overall detection probability is higher for the well-illuminated area.

As noted in Steps 120, 130, and 150, three detection scores, the bright cluster score, the dark cluster score, and the border cluster score, can be produced. These three outputs typically have significantly different dynamic ranges, depending on the number of pixels in each cluster and the algorithm applied, i.e. SSRX, RX retaining only the largest principal components, or SMM. In order to produce one single scene detection result from the three detection scores, three separate thresholds are required. Detection thresholding algorithms are known to one of ordinary skill in the art. Standard approaches to thresholding are readily extended to anomaly detection algorithms by applying them independently to each detection score (i.e., bright, border, and dark) as represented in Steps 125, 135, and 155, respectively. Simply, in this step each detection score is evaluated in comparison to a known threshold to determine whether an anomaly is present or not present.

When detection plane dynamic ranges for the three detection results are similar, a simple sum of detection results can represent overall algorithm performance. However, because of the possible detection plane dynamic range differences, due to the presence or absence of targets in a given cluster, the practical range of thresholds for each respective detection result can be shifted relative to the other results. Thus, the three detection results can be evaluated over a range of fixed threshold differences, for the relevant false alarm rates ($<10^{-3}$ false alarms per pixel), and the set of thresholds corresponding to the overall highest probability of detection can be used to represent algorithm performance. The result is a detection score that, when a truth mask is applied to the data, yields a single probability for detection and a single false-alarm rate in Step 160.

Figure 3:
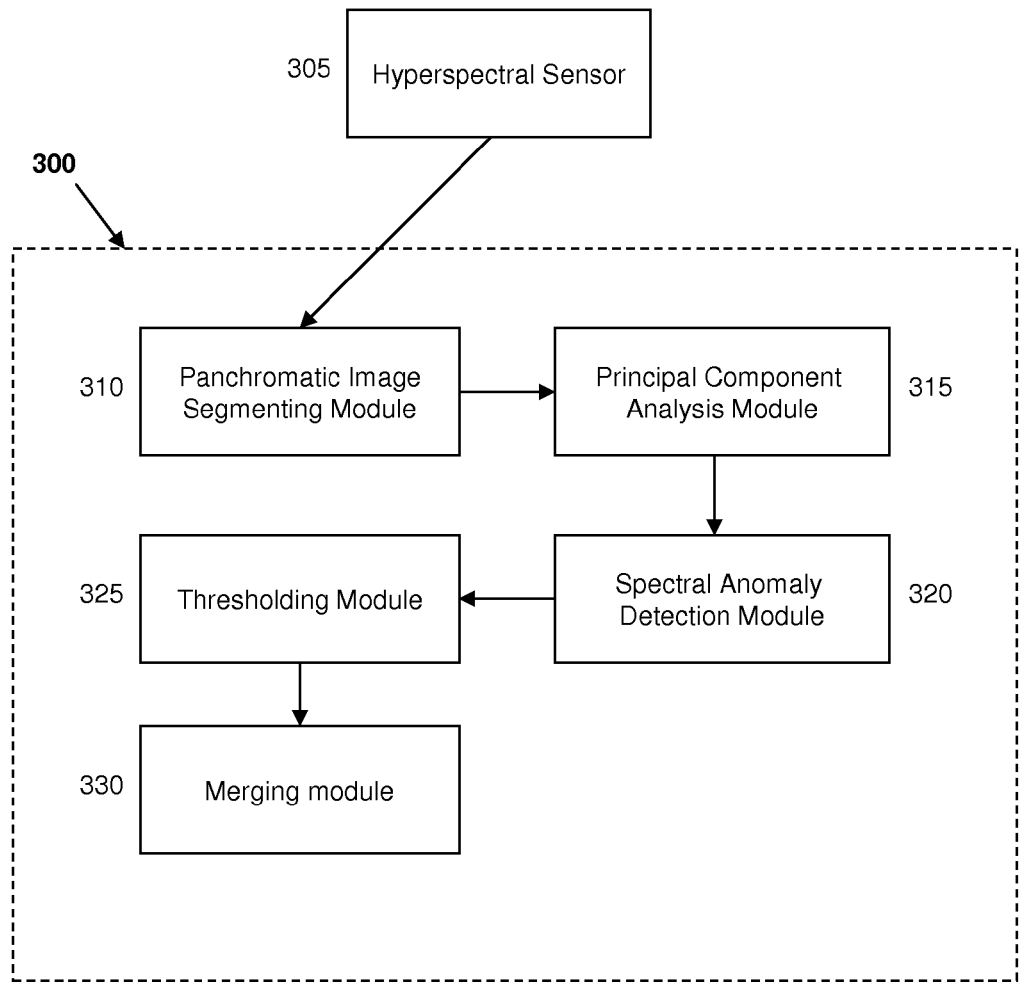
FIG. 3 is a spectral anomaly detection system in accordance with an exemplary embodiment of the invention.

FIG. 3 is a spectral anomaly detection system 300 in accordance with an exemplary embodiment of the present invention. A hyperspectral sensor 305 can be configured to generate a hyperspectral image, and supply that image to the spectral anomaly detection system 300. A panchromatic image segmenting module 310 can be configured to add all collected bands of hyperspectral data in the hyperspectral image obtained from the hyperspectral sensor 305 to create a panchromatic image. Furthermore, panchromatic image segmenting module 310 can then segment the panchromatic image into a dark cluster data set and a bright cluster data set. In addition, a border cluster data set that includes a data set between the bright cluster data set and dark cluster data set can be identified by the panchromatic image segmenting module 310.

A principal component analysis module 315 can be configured to separately perform principal component analysis of the dark cluster data set, the bright cluster data set, and a border cluster data set to produce a plot of principal components for the dark cluster data set, the bright cluster data set, and the border cluster data set. Utilizing the principal component data from the principal component analysis module 315, a spectral anomaly detection module 320 can be configured to separately perform spectral anomaly detection to an adaptively selected subset of principal components for the dark cluster data set, the bright cluster data set, and border cluster data set to produce a dark cluster detection score, a bright cluster detection score, and a border cluster detection score. For example, the adaptively selected subset of principal components can be obtained by varying the detection space dimensionality. Specifically, a high-dimensional detection space can be utilized for bright pixels, and low-dimensional detection space can be utilized for dark, or shadowy, pixels.

Next, a thresholding module 325 can be configured to separately apply thresholding algorithms to the bright cluster, dark cluster, and border cluster detection scores. Finally, the results of the thresholding algorithms can be combined with a merging module 330 in a single detection plane.

Figure 4A:
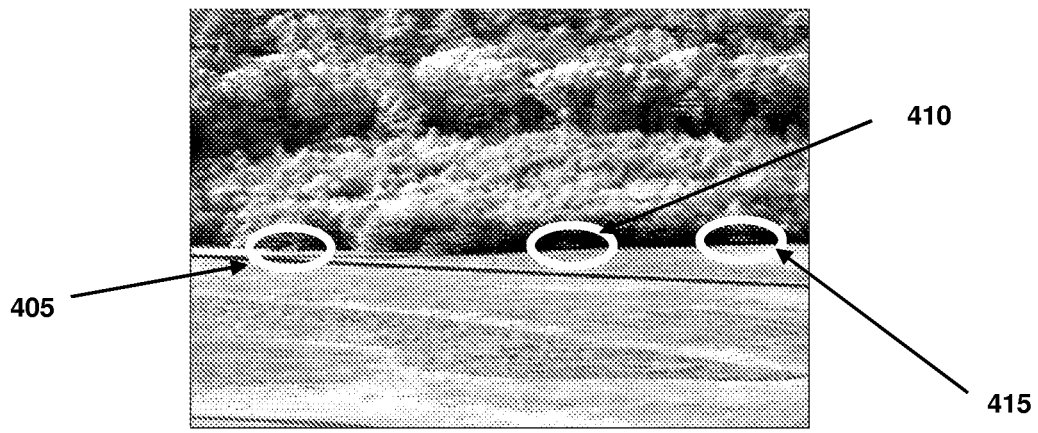
FIG. 4a depicts an example representation of a hyperspectral data set.

FIGS. 4a, 4b, 4c, and 4d provide an example of a spectral anomaly detection method in accordance with an exemplary embodiment of the invention. FIG. 4a depicts an example representation of a hyperspectral data set. The hyperspectral image is of a field at the bottom of the image that leads into a forest at the top of the image. In the middle of the image, where the field and forest meet, there is a shadowy, or dark, area. The image contains three white ellipses 405, 410, and 415 that are highlighting locations where objections, or anomalies, are present in the image. The object in the ellipse on the far left 405 is intended to be conspicuous, while the other two objects 410 and 415, on the right, are in the shadow, or dark, area. The relatively well-illuminated object on the left 405 possesses a distinctively anomalous signature; and therefore, a standard, known in the prior art, implementation of RX anomaly detection should successfully discriminate this object from the background. However, the two objects in the deep shadows 410 and 415, inconspicuous in FIG. 4a, are expected to be difficult to detect.

Figure 4B:
FIG. 4b depicts the results of segmenting a panchromatic image into a dark cluster data set and a bright cluster data set in accordance with an exemplary embodiment of the invention.

FIG. 4b depicts the results of segmenting the panchromatic image of FIG. 4a into a dark cluster data set and a bright cluster data set in accordance with an exemplary embodiment of the invention. Two cluster segmentation results for this data set are shown FIG. 4b, with dark cluster pixels shown as black and bright cluster pixels shown as white. After segmentation, the relatively well-illuminated object 405 is classified into the dark cluster due to its spatial location and its low broadband radiance. Furthermore, solar illuminated natural backgrounds, such as the forest in this data set, tend to provide enough low-radiance pixels for a reliable estimation of dark cluster distribution parameters.

Next, though not depicted, the dark cluster data and bright cluster data of FIG. 4b undergoes a principal component transform analysis. After this analysis, the well-illuminated object 405 should be significantly anomalous and can be detected with nearly zero false alarms. However, while the objects in the shadow 410 and 415 can somewhat be separated from the background, there is a much higher probability of false alarms, and further analysis is warranted to determine if an anomaly actually exists.

Figure 4C:
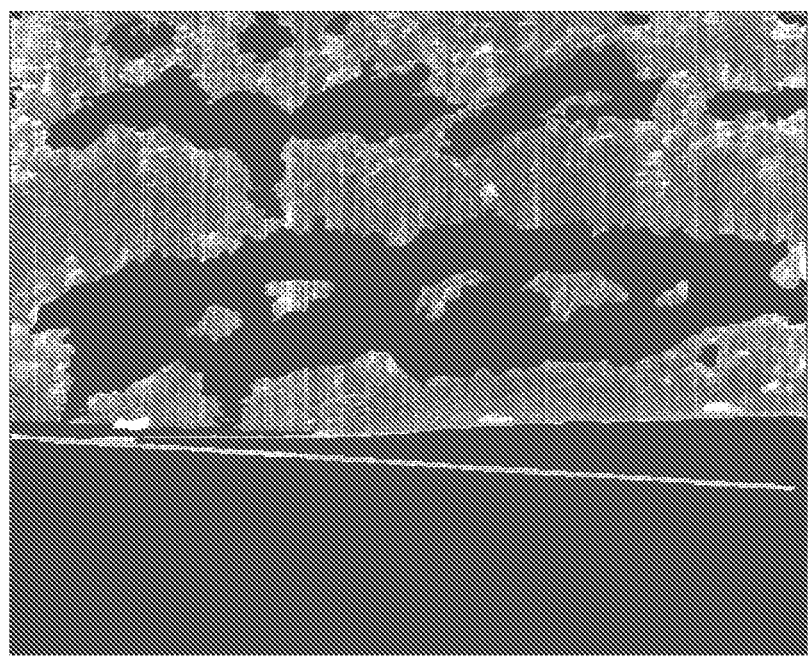
FIG. 4c represents the output after applying an anomaly detection algorithm to an adaptively selected subset of principal components for the dark cluster data set, the bright cluster data set, and border cluster data set in accordance with an exemplary embodiment of the invention.

FIG. 4c represents the output after applying an anomaly detection algorithm to an adaptively selected subset of principal components for the dark cluster data set, the bright cluster data set, and border cluster data set in accordance with an exemplary embodiment of the invention. Specifically, for the spectrally rotated dark cluster data, RX detection is performed utilizing the first ten principal components, and excluding the remaining principal components out. For the bright-cluster data, SSRX detection is performed excluding the first principal component, but utilizing all the remaining principal components. (It should be noted that more than one principal component can be excluded.) The detection result for the exemplary detection method displayed in FIG. 4c, reflect the presence of anomalous objects exclusively in the dark cluster. In comparison with prior art methods, the exemplary detection method can identify the two objects in the deep shadows 410 and 415.

Figure 4D:
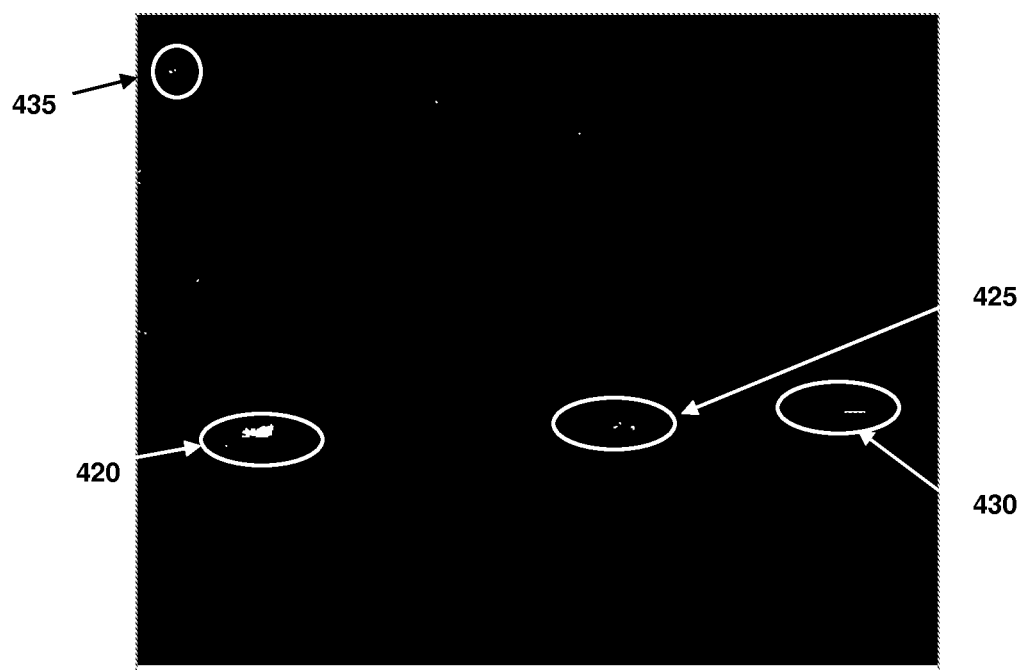
FIG. 4d represents thresholded detection results in accordance with an exemplary embodiment of the invention.

FIG. 4d represents thresholded detection results in accordance with an exemplary embodiment of the invention. In this specific example, the thresholds results correspond to $2.9 \times 10^{-4}$ false alarm rate. The detected objects are marked by white ellipses 420, 425, and 430. It may be noted that small single pixels (e.g., 435) can be present in the threshold results. These single pixels represent noise, and can be removed utilizing a spatial filter.

The exemplary spectral anomaly detection algorithm, i.e., SARX algorithm, can be implemented as a post-process analysis tool or for real-time hyperspectral detection. Post-processing of hyperspectral data can follow the procedures described herein. Real-time implementation of SARX can be straightforward utilizing a block-wise implementation of hyperspectral anomaly detection. That approach can use blocks to handle information flow and computes statistics within a sliding window comprised of several blocks. Real-time segmentation can be performed in this block-wise structure. Latency is needed for SARX to perform segmentation within the sliding window. However, the core RX processing remains the same, applied to the dark and bright cluster detection subspaces separately.

The invention can be used with computer hardware and software that performs the methods and processing functions described above. As will be appreciated by a person of skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

It should be understood that the foregoing relates only to illustrative embodiments of the present invention, and that numerous changes may be made therein without departing from the scope and spirit of the invention as defined by the following claims.

The invention claimed is:

1. A spectral anomaly detection method, comprising the steps of:
   generating a panchromatic image;
   segmenting the panchromatic image into a dark cluster data set and a bright cluster data set;
   separately performing principal component analysis of the dark cluster data set, the bright cluster data set, and a border cluster data set to produce a plot of principal components for the dark cluster data set, the bright cluster data set, and the border cluster data set, wherein the border cluster data set comprises a data set between the bright cluster data set and dark cluster data set;
   determining a detection space dimensionality for each of the dark cluster data set, the bright cluster data set, and the border cluster data set to produce an adaptively selected subset of principal components of the dark cluster data set, the bright cluster data set, and the border cluster data set;
   applying an anomaly detection algorithm to the adaptively selected subset of principal components for the dark cluster data set, the bright cluster data set, and border cluster data set to produce a dark cluster detection score, a bright cluster detection score, and a border cluster detection score;
   applying a separate detection thresholding algorithm to each of the dark cluster detection score, bright cluster detection score, and border cluster detection score; and
   combining the results of the detection thresholding algorithms in a single detection plane.

2. The method of claim 1, wherein the step of generating the panchromatic image comprises adding all collected bands of hyperspectral data in a hyperspectral image.

3. The method of claim 1, wherein the step of segmenting the panchromatic image into dark and bright clusters comprises the step of utilizing an adaptive clustering algorithm for gray-level imagery that separates all data set pixels of the panchromatic image into the dark clusters and the bright clusters.

4. The method of claim 1, wherein the detection space dimensionality for the dark cluster data set comprises less than ten principal components.

5. The method of claim 1, wherein the detection space dimensionality for the dark cluster data set comprises low-dimensional detection space for dark pixels.

6. The method of claim 1, wherein the anomaly detection algorithm is a RX algorithm.

7. The method of claim 1, where in the detection space dimensionality for the bright cluster data set comprises high-dimensional detection space for bright pixels.

8. A spectral anomaly detection system, comprising:
   a hyperspectral sensor configured to generate a hyperspectral image;
   a panchromatic image segmenting module, configured to add all collected bands of hyperspectral data in the hyperspectral image to create a panchromatic image, and then segment the panchromatic image into a dark cluster data set and a bright cluster data set, wherein the panchromatic image segmenting module is implemented in a computer system that comprises instructions stored in a machine-readable medium and a processor that executes the instructions;
   a principal component analysis module configured to separately perform principal component analysis of the dark cluster data set, the bright cluster data set, and a border cluster data set to produce a plot of principal components for the dark cluster data set, the bright cluster data set, and the border cluster data set, wherein the border cluster data set comprises a data set between the bright cluster data set and dark cluster data set, wherein the principal component analysis module is implemented in a computer system that comprises instructions stored in a machine-readable medium and a processor that executes the instructions;
   a spectral anomaly detection module configured to separately perform spectral anomaly detection to an adaptively selected subset of principal components by determining a detection space dimensionality for each of the dark cluster data set, the bright cluster data set, and border cluster data set to produce the adaptively selected subset of principal components of the dark cluster data set, the bright cluster data set, and the border cluster data set, and applying an anomaly detection algorithm to the adaptively selected subset of principal components for the dark cluster data set, the bright cluster data set, and border cluster data to produce a dark cluster detection score, a bright cluster detection score, and a border cluster detection score, wherein the spectral anomaly detection module is implemented in a computer system that comprises instructions stored in a machine-readable medium and a processor that executes the instructions;
   a thresholding module configured to separately apply thresholding algorithms to the bright cluster, dark cluster, and border cluster detection scores, wherein the thresholding module is implemented in a computer system that comprises instructions stored in a machine-readable medium and a processor that executes the instructions; and a merging module configured to combine the results of the detection thresholding algorithms in a single detection plane, wherein the merging module is implemented in a computer system that comprises instructions stored in a machine-readable medium and a processor that executes the instructions.

9. A spectral anomaly detection method, comprising the steps of:

segmenting a panchromatic image into a plurality of cluster data sets;

separately performing principal component analysis of the cluster data sets to produce a plot of principal components;

determining a detection space dimensionality for each of the cluster data sets to produce an adaptively selected subset of principal components for the cluster data sets;

applying an anomaly detection algorithm to the adaptively selected subset of principal components for the cluster data sets to produce a plurality of cluster detection scores;

applying a separate detection thresholding algorithm to each of the cluster detection scores; and combining the results of the detection thresholding algorithms in a single detection plane.

* * * * *